Figure 2:
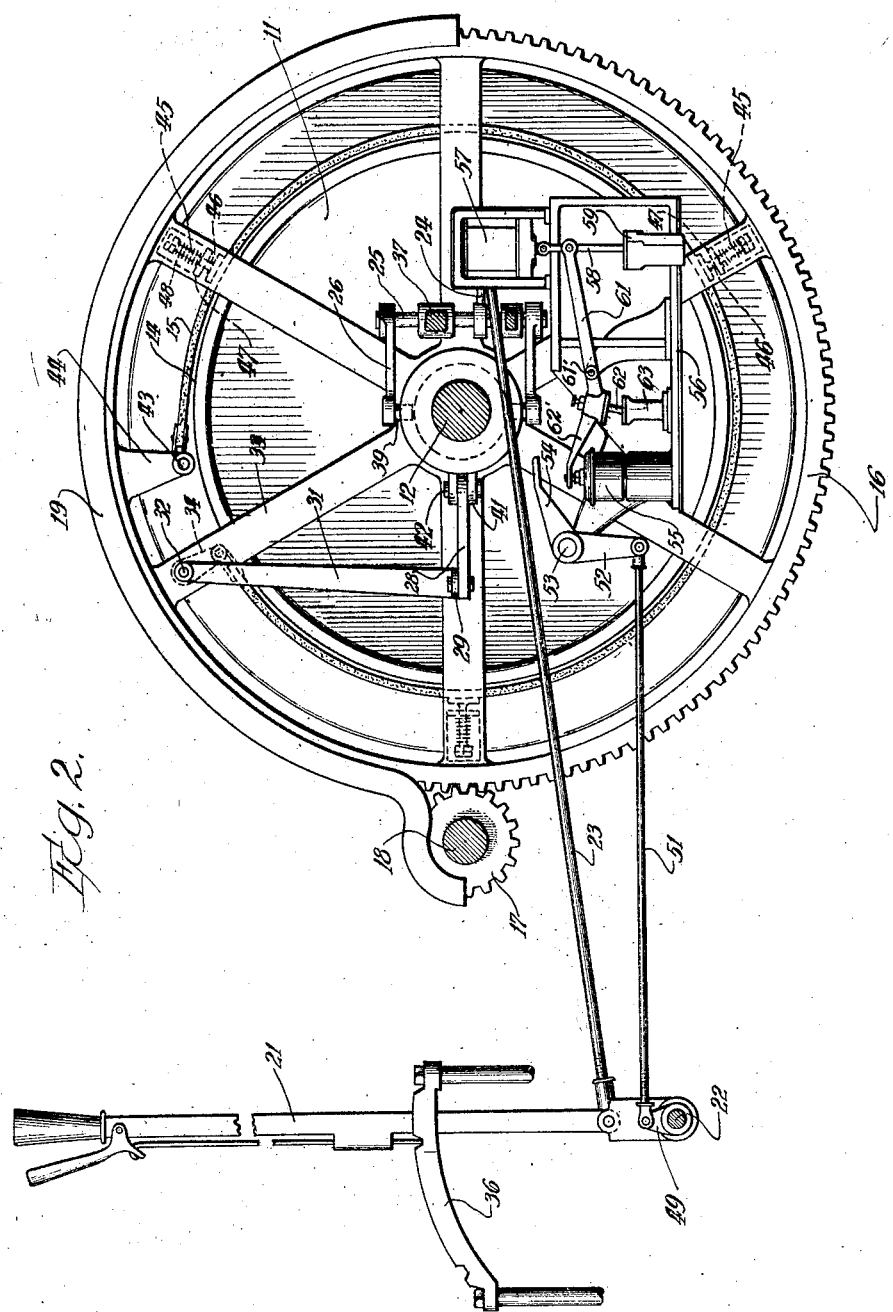

May 15, 1928.  
E. B. MEAD  
EMERGENCY BRAKE CONTROL  
Filed July 13, 1925  
1,669,621  
2 Sheets-Sheet 1
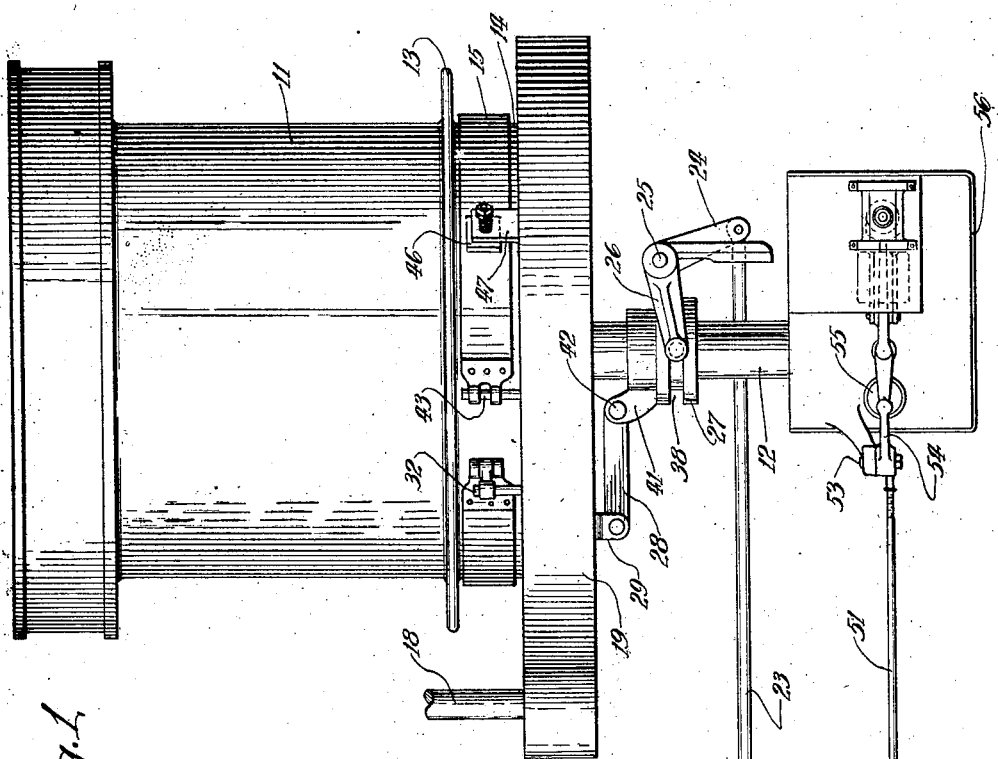
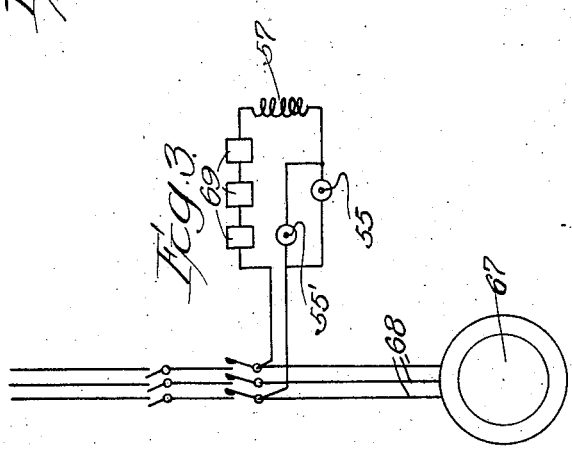
Inventor  
Ezra B. Mead  
By Munday, Clarke & Carpenter  
Attys.

May 15, 1928.

E. B. MEAD

EMERGENCY BRAKE CONTROL

Filed July 13, 1925

1,669,621

2 Sheets-Sheet 2

Inventor:
Ezra B. Mead
By: Munday, Clarke & Carpenter
Attys.

Patented May 15, 1928.

1,669,621

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

EMERGENCY-BRAKE CONTROL.

Application filed July 13, 1925. Serial No. 43,065.

My invention relates to hoisting apparatus and more particularly to the emergency brake thereof, the primary object of the invention being to provide means for automatically controlling the emergency brake application in manner which is particularly advantageous in certain types of apparatus.

From certain aspects, the invention has the same general objects stated in my earlier Patent 1,551,830, issued September 1, 1925, but the device provided by the present invention accomplishes these objects in a different and, in some respects, perhaps, preferable manner and possesses certain novel characteristics, as will be hereinafter more fully pointed out and claimed.

A particular type of apparatus with which the device of the invention is adapted to be advantageously used is a tail rope haulage engine for trips or dump trucks running on a track in which a double drum machine is employed with one rope going to the head of the trip and another passing over sheaves at one side of the track to the extreme end of travel, returning on rollers in the center of the track and attaching to the tail of the trip. Where the track grades favor the loaded trips coming out and are adverse to the empties returning, the tail rope is used to check the speed of the loaded trips on the down grade and to pull the empties back. This necessitates clutching the tail rope drum to the driving shaft as said empties are being returned, said tail rope drum, however, being loose on said shaft when the trip is coming out under the power of the head rope, with the head rope drum clutched to the shaft. It is, obviously, necessary, in cases of emergency, as when the driving power fails, that application of the emergency brake be accomplished on the loose drum, i. e., the tail rope drum when the trips are coming out and the head rope drum when the empties are returning, and the clutch should be disengaged at the time of said emergency brake application. The principal object of my invention is the provision, in apparatus of this character, of a device associated with the clutch and interlocked with the emergency brake mechanism for preventing the operation of the latter while the clutch is engaged.

While I have referred to the use of the device more particularly in connection with the tail rope haulage system, it is also applicable to single drum apparatus where the trip is returned by gravity, it being desirable, in such apparatus, to employ a clutch whereby the drum may be disengaged from the shaft and allowed to spin alone, in order that the empty trip may be permitted to return downgrade faster than the loads are hoisted, without injury to the motor.

Numerous other objects and advantages of the invention will be apparent as it is better understood from the following description, which, taken in connection with the accompanying drawings, discloses a preferred embodiment thereof.

Referring to the drawings,

Figure 1 is a plan view of an apparatus in which my invention is embodied;

Fig. 2. is a side elevation thereof;

Fig. 3 is a diagram of electrical connections for the elements of my invention.

To illustrate my invention I have shown on the drawings a friction drum 11 loosely mounted upon a driving shaft 12 and adapted to engage and wind up rope upon its surface for haulage purposes. The drum 11 near one end is provided with a flange beyond which is a friction surface 14 surrounded by a clutch band 15, which is carried by a gear 16 fixed to said shaft 12. The gear is driven by a pinion 17, mounted upon a shaft 18 which is driven by an electric motor 67 or any suitable source of power, such as a steam or gas engine, or the like. A guard 19 is arranged over said gear and pinion. The clutch band 15 is adapted to be tightened around the portion 14 of the drum 11 by means of a hand lever 21, secured at its lower end to a shaft 22 and having a rod 23 connected thereto at one end and at its opposite end to an arm 24, secured to a pivot 25 and rigid with upper and lower arms 26, which are engaged with a collar 27 slidable upon said shaft 12 and connected by a link 28 with a horizontal arm 29 on a vertical lever 31, which is pivoted at 32 to a spoke 33 of the gear, the pivot 32 being connected by a lever 34 with the free end of said band 15. Said lever 21 extends through a slot 35 in a frame guard 36 and the shaft 25 is journaled in fixed bearings 37. The collar 27 has a groove 38 therein, in which are disposed suitable studs, or rollers, 39 on the arms 26, ears 41 being projected from the front of said collar and the link 28 being pivoted to said ears, as indicated at 42.

The end of the band 15 opposite that to which the lever 34 is secured is fixedly secured at 43 to an inward projection 44 on the gear 16 and said band is normally held in outward, or disengaged position, by means of springs 45, mounted upon supports 46 secured at one end to said band 15 and extending through horizontal arms 47 of brackets 48 secured to the gear 16. It is obvious that movement of the hand lever 21 to the left in Fig. 2 of the drawings, will tighten the band 15 upon the drum and clutch the latter to said gear 16.

For the purpose of illustrating my invention I have shown a clutch mechanism and means associated therewith for controlling the operation of an emergency brake. The brake itself is not shown since it may be of any well known or preferred construction, arranged to engage the drum 11 preferably at the end 66 opposite the clutch band. The brake is actuated by fluid pressure, compressed air, oil or water being employed as the fluid medium. Brakes of this character are usually applied through the agency of powerful weights or springs, the brake being released by counteracting the pressure exerted by the weights or springs by means of fluid pressure applied through the fluid medium, the brake releasing pressures being applied through a specially constructed valve. The valve and brake control means embodied in my present invention is preferably of the character shown and described in U. S. Letters Patent Nos. 1,373,194, 1,373,195 and 1,373,196, issued to the Ottumwa Iron Works as my assignee, on March 29, 1912, and comprises a brake operating valve 63, a solenoid 57 for actuating the valve, a switch 55 for controlling the solenoid circuit and an interlock for preventing the operation of the valve actuating solenoid when the clutch 15 is in engaged position. The valve 63 is a device having a movable valve stem 62 and provides means whereby fluid under brake releasing pressure is admitted to a brake releasing cylinder when the valve stem 62 is in an upward position relative to the valve and is allowed to escape from the brake releasing cylinder when the valve stem is in a downward position. The valve 63 is mounted upon a supporting frame 56 and the valve stem 62 extends upwardly of the valve. The solenoid 57 is also mounted upon the frame 56 and has a movable core connected to the upper end of a stem 58, the lower end of which engages a dashpot 59. The dashpot comprises a cylinder containing a fluid, and a piston which is secured to the end of the stem 58. The piston resists the movement of the stem 58 by restricting the passage of the fluid in the dashpot from one side of the piston to the other as it moves in the cylinder. The details of construction of the dashpot are not illustrated for it is believed that the operation and the construction of such a device is well known and understood and its purpose as an element of my present invention is to limit the speed at which the solenoid core may drop down after the solenoid is de-energized. The lever 61 is connected to the rod 58 and is pivoted at 61 to the frame 56. The lever is provided with an extended arm 62' which is pivotally connected to the upper end of the valve stem 62 and which overlaps the push button 55. The push button 55 is of any suitable type adapted to make electrical contact upon movement of the parts thereof and is secured upon the frame 56. The push button 55 and the solenoid 57 are connected together electrically in series and the circuit is connected to a source of electrical power which may be the main power line 68 which supplies power to the driving motor mounted on the counter-shaft 18. Various safety devices 69 comprising well known relay circuit breakers are used in connection with the main power line and are arranged to break the solenoid circuit whenever an emergency application of the brake becomes necessary, as when the power goes off due to a substation failure or when other abnormal power conditions prevail. The connections for the actuation of the relays are not shown as they are well known and understood in the art of remote electrical control.

A manually operable push button 55' is connected in parallel with the push button 55 and is mounted in the operator's station. The solenoid 57 takes its energy through one of the push buttons 55 or 55'. If the solenoid is not energized the push button 55 on the emergency device is open, it being understood that the solenoid cannot be originally energized through this push button, but only through the push button 55' on the operator's stand. The push button 55' is operated whenever it is desired to energize the solenoid in order to release the emergency brake. When energized, the solenoid raises the core thus operating the lever 61 and the valve 63 to release the emergency brake. The lever 61 also operates the push button 55 through the extension arm 62' which, once the solenoid is energized through the push button 55', maintains the energizing circuit of the solenoid regardless of whether the push button 55' is closed or not, until the current is interrupted by the operation of some emergency relay which breaks the solenoid circuit and applies the emergency brake, whenever the conditions in the power line become abnormal.

In order to prevent the application of the emergency brake while the clutch is engaged, I have provided a mechanism controlled by the clutch operating lever 21 and comprising an arm 49 mounted on the shaft 22 and connected by a rod 51 to an arm 52 of a bell crank pivotally mounted on a short shaft 53 which is supported upon the frame 56. The bell crank has an arm 54 arranged to engage upon the end of the projecting arm 62' of the lever 61 and to prevent operation of the emergency brake actuating mechanism whenever the clutch is in engaged position. The interlock between the arm 62' and the arm 54 is effected by the operation of the clutch control lever. If the solenoid 57 is de-energized while the clutch is engaged, the brake mechanism is prevented from operating until the arm 62' is allowed to rise by the movement of the lever 21 in disengaging the clutch, such movement operating to raise the lever 54 from interlocking engaged position upon the lever portion 62' which is then permitted to rise and thereby to operate the brake controlling valve 63 and to apply the brakes. By interlocking the clutch and the emergency brake in this manner the operation of the brake mechanism is effectively prevented until the clutch has been disengaged. This is accomplished without the use of separate or deferred brake apparatus, such as illustrated and described in my first mentioned earlier patent.

The interlocking devices which I have described and illustrated are especially adapted for use in connection with electrically driven hoisting apparatus and the solenoid 57 is energized in parallel from the power lines which supply energy to drive the electric motor mounted on the shaft 18.

My improved emergency brake system, however, is also adapted for use in connection with steam driven or gasoline driven hoists, the safety devices 69 for breaking the solenoid circuit in such cases being actuated by pneumatic or other known means to open the solenoid circuit whenever the driving power supplied to the shaft 18 fails, becomes excessive, or is otherwise abnormal.

While I have shown on the drawings hoisting apparatus having but a single drum, it will be apparent that in case of a tail rope haulage system in which a double drum is necessary, individual interlocking mechanisms, such as I have described, may be furnished to operate in connection with each drum separately, and in such cases each separate mechanism is separately interlocked with the clutching mechanism of the separate drums.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. In hoisting apparatus, the combination of a drum, a drum driving member, means for driving said drum driving member and provided with emergency brake mechanism arranged to control said drum, a clutch for connecting the drum to the drum driving member, means for operating said clutch, and means controlled by said last mentioned means and arranged to prevent operation of the emergency brake mechanism while said drum driving member and drum are connected together.

2. In hoisting apparatus, the combination of a drum, a drum driving member, means for driving said drum driving member and provided with emergency brake mechanism suitably arranged to brake the drum, a clutch device for connecting the drum to the driving member, clutch operating mechanism, and means automatically operable by said clutch operating mechanism for preventing operation of the emergency brake mechanism while said clutch is engaged.

3. In hoisting apparatus, the combination of a drum, a drum driving member, means for driving said drum driving member and provided with emergency brake mechanism suitably arranged to brake the drum, a clutch device for connecting the drum to the driving member, and devices associated with the clutch operating mechanism and with the emergency brake mechanism for preventing operation of the emergency brake mechanism while the clutch is engaged.

4. In hoisting apparatus, the combination of a drum, a drum driving member, means for driving said drum driving member and provided with emergency brake mechanism suitably arranged to brake the drum, a clutch device for connecting the drum to the driving member, clutch operating mechanism, and devices associated with the clutch operating mechanism and with the emergency brake mechanism for preventing operation of the emergency brake mechanism while the clutch is engaged, said devices including a valve having a part movable for operating the emergency brake, and means for preventing movement of the movable part of the valve under predetermined conditions.

5. In hoisting apparatus, the combination of a drum, a drum driving member, means for driving said drum driving member and provided with emergency brake mechanism suitably arranged to brake the drum, a clutch device for connecting the drum to the driving member, clutch operating mechanism, and devices associated with the clutch operating mechanism and with the emergency brake mechanism for preventing operation of the emergency brake mechanism while the clutch is engaged, said devices including links connected to said clutch operating mechanism for operation thereby, formed and arranged to prevent operation of the emergency brake mechanism while the clutch is engaged.

EZRA B. MEAD.